UNITED STATES PATENT OFFICE.

GUSTAV R. SCHLUMBERGER, OF ALLEGHENY, PENNSYLVANIA.

STEERING DEVICE FOR AUTOMOBILES.

SPECIFICATION forming part of Letters Patent No. 709,684, dated September 23, 1902.

Application filed January 21, 1902. Serial No. 90,696. (No model.)

*To all whom it may concern:*

Be it known that I, GUSTAV R. SCHLUMBERGER, a citizen of the United States of America, residing at Allegheny, in the county of Allegheny and State of Pennsylvania, have invented certain new and useful Improvements in Steering Devices for Automobiles and the Like, of which the following is a specification, reference being had therein to the accompanying drawings.

This invention relates to certain new and useful improvements in steering devices for automobiles and the like, and has for its object the provision of novel means whereby the wheels may be turned independently from the axle.

The present invention further contemplates providing a device of the above-described character whereby both wheels may be turned in unison with one another in one direction or the other; furthermore, to provide novel means that will admit the power to be applied directly to the axle.

My invention still further aims to provide a device of the above-described character that will be extremely simple in construction, strong, durable, comparatively inexpensive to manufacture, and highly efficient in its use.

With the above and other objects in view the invention consists in the novel combination and arrangement of parts, to be hereinafter more fully described, and specifically pointed out in the claim.

In describing the invention in detail reference is had to the accompanying drawings, forming a part of this specification, and wherein like numerals of reference indicate like parts throughout the several views, in which—

Figure 1:
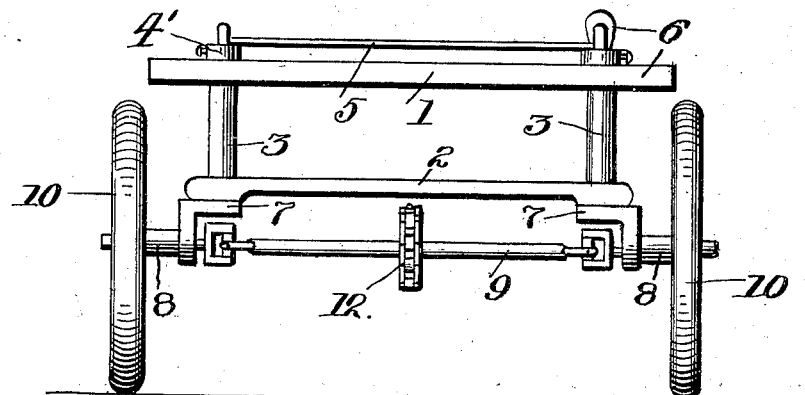
Figures 2, 3:
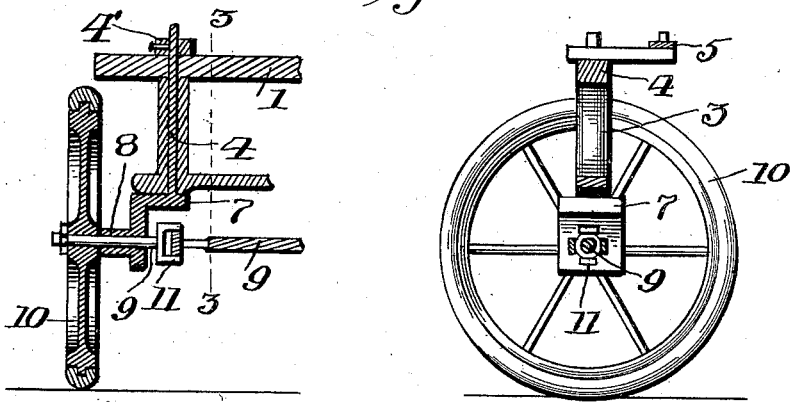
Figure 4:
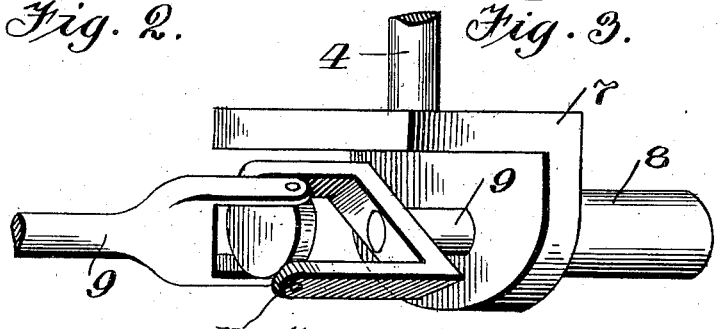

Figure 1 is a front view of my improved steering device attached to a vehicle. Fig. 2 is a vertical sectional view thereof. Fig. 3 is a vertical sectional view taken on the line 3 3 of Fig. 2 looking in the direction of the arrow. Fig. 4 is a perspective view of the connection between the axle and steering device.

In the drawings the reference-numeral 1 represents the vehicle-body, and 2 represents the cross-piece, said cross-piece being connected by the hollow standards 3, through which extend the rods 4, the upper end of said rods being connected by a lever 5, secured to the operating-lever 6. At the lower ends of the rods 4 are carried angular extensions 7, having formed integral therewith a sleeve 8, through which extends the axle 9 of the wheel 10, said axle having formed therein knuckle-joints 11. In the central portion of the axle 9 is secured a sprocket-wheel 12, to which the driving power may be applied by a sprocket-chain, as shown in Fig. 1 of the drawings. It will be noted that by this arrangement the wheels may be easily and abruptly turned in any desired direction, and by reason of the angular extensions and knuckle-joints the wheels may be turned from a point near the hub of the wheel. It will be noted that the upper portion of the angular extension 7 is in engagement with the lower face of the cross-piece 2, thereby limiting the movement of the rod 4, carried by the extension, the upper end of the rod carrying a collar 4', which engages the vehicle-body.

By turning the lever 6 the wheels will be turned in unison, and the advantages secured when desiring to turn sharp curves will be readily apparent.

The many other advantages obtained by reason of the novel construction shown will be readily understood from the foregoing description, taken in connection with the accompanying drawings.

It will be noted that various changes may be made in the details of construction without departing from the general spirit of my invention.

Particular attention is directed to the fact that the rod is in direct vertical alinement above the knuckle-joint 11, thereby assuring an easy movement to the axle in either direction. Power may be applied to the axle, as shown, or the axle may be driven in any suitable manner from a motor suspended from the vehicle-body.

Having fully described my invention, what I claim as new, and desire to secure by Letters Patent, is—

In a steering apparatus of the type set forth, the combination of a vehicle-body and a cross-piece carried thereby with hollow standards interposed between said vehicle-body and cross-piece, rods turnably secured within said hollow standards and carrying collars at their upper ends engaging the vehicle-body, rightangular extensions rigidly secured to the lower ends of said rods and engaging the under face of the cross-piece, sleeves formed integral with the depending portions of said extensions with wheeled axles mounted in said sleeves, the inner ends of said axles extending beyond said depending portion of the extension and carrying knuckle-joints, and a connecting-rod secured to the upper ends of the rods, substantially as described.

In testimony whereof I affix my signature in the presence of two witnesses.

GUSTAV R. SCHLUMBERGER.

Witnesses:
JOHN NOLAND,
E. E. POTTER.